Sept. 8, 1970 D. E. JORDAN 3,527,329
DIAPHRAGM OPERATED BRAKE OR CLUTCH UNIT
Filed June 12, 1968 2 Sheets-Sheet 1

INVENTOR.
DONALD E. JORDAN
BY
McCormick, Paulding & Huber
ATTORNEYS

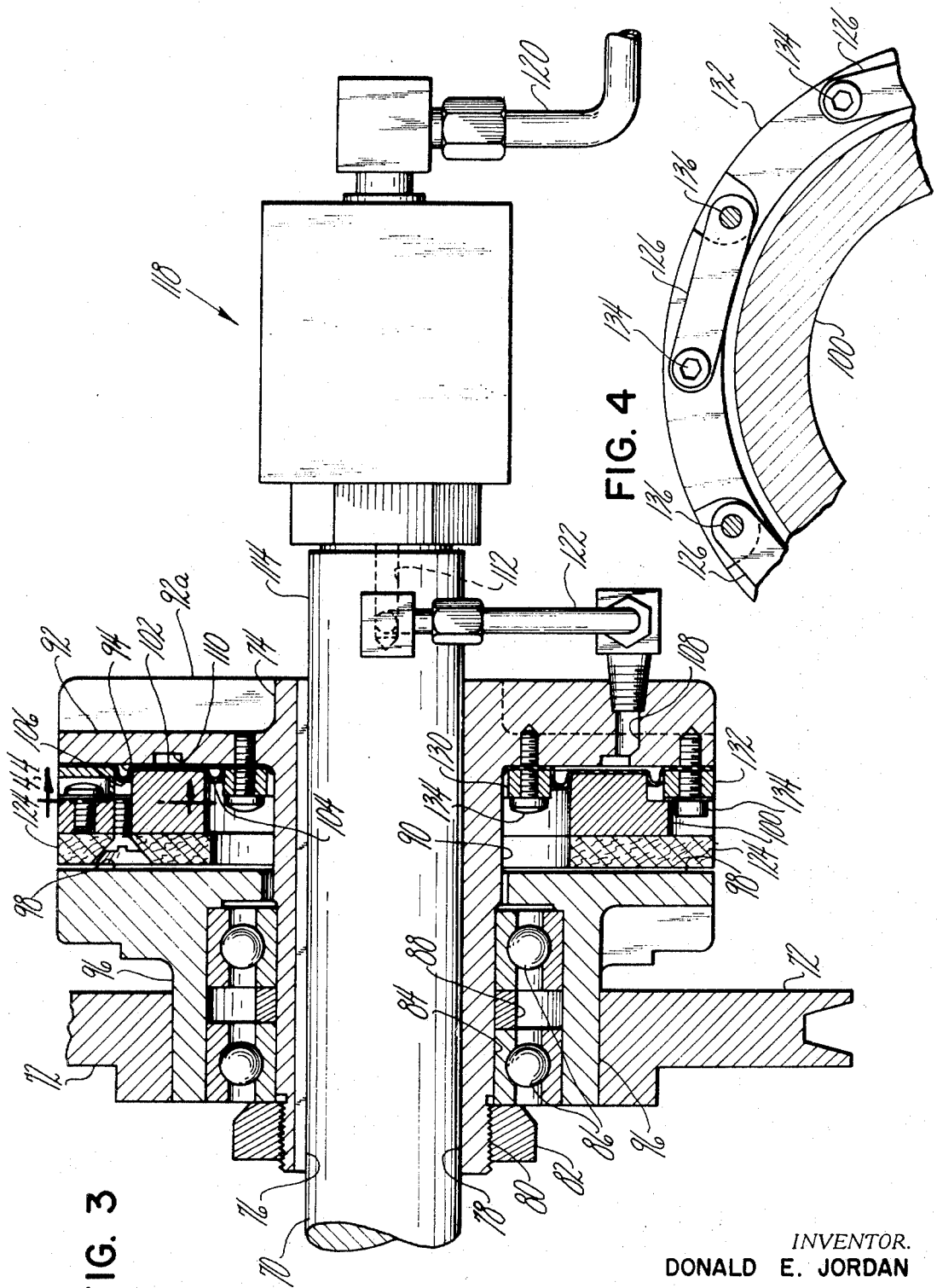

United States Patent Office 3,527,329
Patented Sept. 8, 1970

1

3,527,329
DIAPHRAGM OPERATED BRAKE OR
CLUTCH UNIT
Donald E. Jordan, Charlestown, N.H., assignor, by mesne
assignments, to Pneumatic Applications Company, a
corporation of Connecticut, formerly known as Robert
Hauser Inc.
Filed June 12, 1968, Ser. No. 736,388
Int. Cl. F16d 25/00
U.S. Cl. 192—88          8 Claims

ABSTRACT OF THE DISCLOSURE

A shaft to be braked or clutched has a flanged hub keyed thereto, and an outer housing rotatably supports the hub on two spaced bearings to prevent wobble of the hub flange with respect to one end of the housing. A brake shoe is mounted on an annular piston, which piston is supported for limited axial movement in response to inflation of an annular rubber diaphragm acting between the piston and either the hub flange or the end of the fixed housing. Air under pressure is provided either through the housing or through the hub flange to one side of the diaphragm for moving the brake shoe against either the rotating hub flange or the end of the housing respectively, and leaf springs act between the piston and the housing, or the hub flange respectively, to react the torque from the shaft being braked, or clutched, and to hold the shoe out of engagement with the hub flange, or the end of the housing, when the unit is not operating.

SUMMARY OF INVENTION

This invention relates to a diaphragm operated brake or clutch unit wherein the torque from the shaft being braked or clutched is so reacted that friction due to axial sliding movement of the various parts is effectively eliminated.

In monitoring and regulating automatic machinery through the use of servo controlled air operated clutches or brake units, it has been found that the relationship between the torque output of the unit and the input required to produce this torque is one which must be closely controlled in the design of these units. More particularly, one problem which has plagued the prior art clutch and brake designs has been an inability of these units to react predictably to small variations in the inputs thereto. This hysteresis effect is throught to be due to axial sliding friction within the units actuator assembly, and more specifically the portion thereof which must be restrained against rotation in order to absorb the reactive torque.

The general object of the present invention is to provide a diaphragm operated brake or clutch unit wherein an annular piston is moved axially by an expandable air operated diaphragm, and wherein axial sliding friction of the piston is avoided by not reacting the deceleration or acceleration torque through drive pins or splines associated with the axially movable piston.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

2

Figure 1:
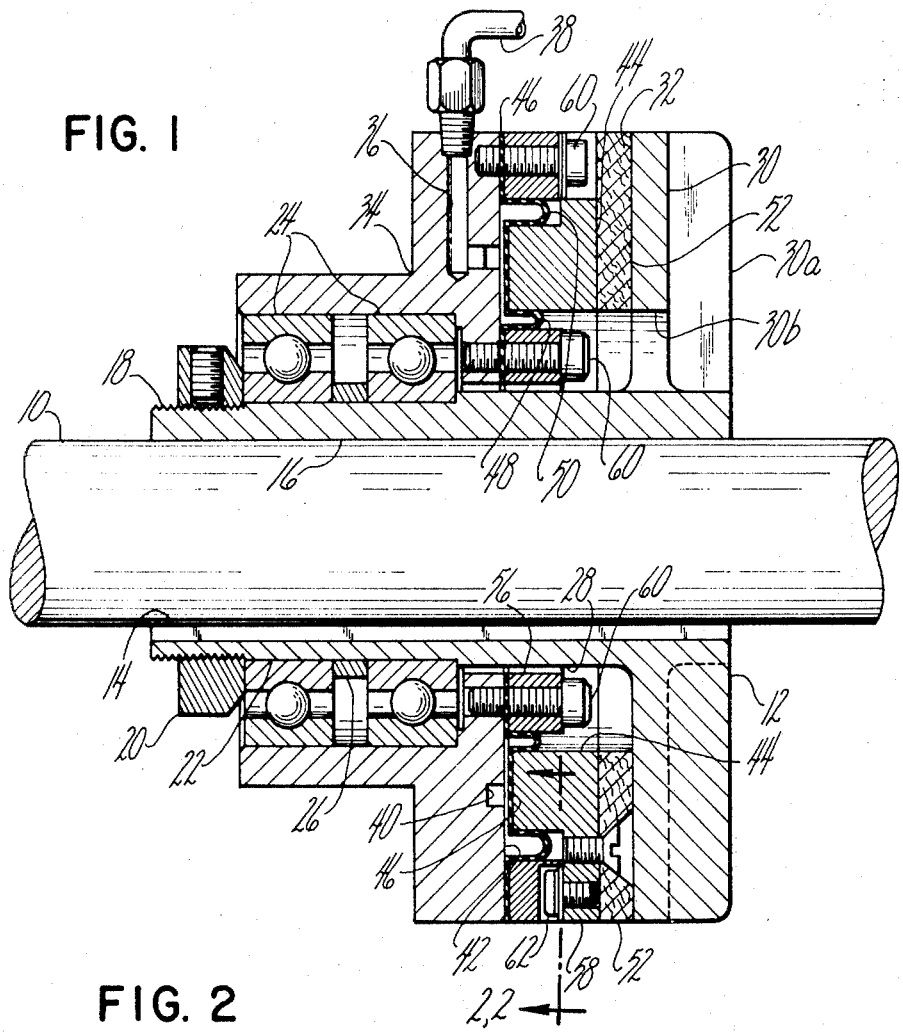
FIG. 1 is a vertical sectional view of a brake unit constructed in accordance with the present invention.
Figure 2:
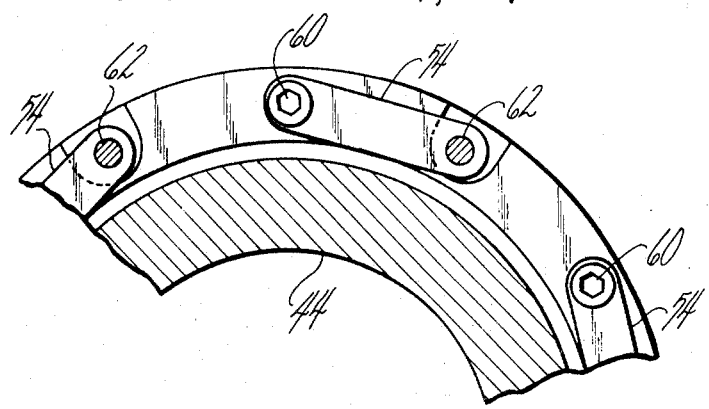

FIG. 2 is a sectional view taken along the line 2—2 of FIG. 1.

FIG. 3 is a vertical sectional view of an alternative construction embodying the present invention, being particularly well suited to operation as a clutch unit.

FIG. 4 is a sectional view on line 4—4 of FIG. 3.

DETAILED DESCRIPTION OF BRAKE UNIT

A brake unit of the present invention is shown in FIGS. 1 and 2 mounted to a rotating shaft 10 which is to be braked or decelerated. The brake unit comprises an inner hub 12 adapted for attachment to the shaft 10 to be decelerated or braked, as for example, by the key 14. The hub 12 includes a tubular sleeve portion 16 having a threaded portion 18 to receive the annular nut 20, a somewhat larger diameter intermediate portion 22 for receiving two bearing members 24, 24 separated by a spacer 26, and a somewhat larger diameter portion 28 for receiving the various annular shaped parts of the brake actuator assembly to be described. Still with reference to the hub 12, a radially outwardly extending flange 30 is provided at the forward end of the hub 12 and defines a rearwardly facing friction surface 32. The forward side of the hub flange 30 is provided with radially extending cooling ribs as shown at 30a since the embodiment of the brake unit shown in FIG. 1 is air cooled. In order to further facilitate the air cooling of the brake unit shown, openings are preferably provided adjacent the portion 28 of the sleeve 16 in the hub 12 as shown generally at 30b, 30b.

The brake unit shown in FIG. 1 also includes an outer housing 34 which receives the outer races of the bearing members 24, 24 and these roller bearings rotatably receive the sleeve portion 16 of the hub 12. In the embodiment of the invention shown in FIG. 1, the housing 34 would be fixed by suitable means (not shown) and the forward end portion of the housing 24 provided with a radially extending bore 36 to which an air line 38 is connected as shown for providing air under pressure to an annular groove 40 provided for this purpose in the forward face 42 of the outer housing 34. As shown, the forward face 42 of the housing 34 defines a radially extending surface which is parallel to and axially spaced from the friction surface 32 of the hub flange 30 described hereinabove.

In accordance with the present invention, an annular piston 44 is slidably received between the surfaces 42 and 32 of the housing and inner hub respectively, and it is an important feature of the present invention that this piston 44 is not restrained by axially extending pins or by axially extending splines on either the housing 34 or the hub 12.

In further accordance with the present invention, an annular diaphragm 46 is provided in sealed relationship to the forward face 42 of the outer housing 34, and said diaphragm includes radially spaced forwardly protruding beads 48 and 50 for engaging the inner and outer marginal edges of the annular piston 44, respectively. More particularly, means is provided for sealing the inner and outer peripheral edges of the diaphragm with respect to the forward end 42 of the outer housing 34 so that fluid under pressure introduced through the port 36 and the annular groove 40 to the rear side of the diaphragm can cause said diaphragm to expand forwardly, moving with it the annular piston 44.

In still further accordance with the present invention, an annular brake shoe 52 is mounted to the forward face of the annular piston 44 for engaging the rearwardly facing surface 32 of the hub flange 30 in response to movement of the diaphragm and piston in said forward axial direction. As best shown in FIG. 2, tangentially extending leaf spring elements 54, 54 are connected at one end to a non-rotating portion of the brake unit and at their other ends to the annular piston to react the moments produced upon engagement between the brake shoe 52 and the friction surface 32, which springs also serve to urge the piston 34 rearwardly when fluid under pressure is not provided to the rear side of the diaphragm.

Preferably, and as best shown in FIG. 1, the means for sealing the inner and outer peripheral edges of the diaphragm with respect to the forward end of the outer housing 34 comprise inner and outer camping rings 56 and 58 respectively, which rings are held to the forward end of the housing 34, and clamp the inner and outer marginal edge portions of the diaphragm thereto by a plurality of screws 60, 60. As best shown in FIG. 2, the outer row of screws 60, 60 also serve to connect one end of each of the leaf springs 54, 54 to the outer clamping ring 58. A plurality of oppositely arranged screws 62, 62 serve to connect the opposite ends of the leaf springs 54, 54 to the periphery of the annular piston 44. As shown in FIG. 2, all of said leaf springs extend generally tangentially between said piston and said outer clamping ring and are located adjacent the outer periphery of the annular piston. As so constructed and arranged, these leaf springs 54, 54 are well adapted to react torsional moments created as a result of engagement between the brake shoe and its associated friction surface, without the necessity for providing axially extending splines or pins in the brake unit with their incipient tendency for the creation of undesirable non-linear friction characteristics in the response curve of an air operated brake unit of the type described herein:

DETAILED DESCRIPTION OF CLUTCH UNIT

FIGS. 3 and 4 of the drawings show an alternative construction embodying the present invention, which construction comprises a clutch unit adapted to be mounted adjacent one end of a rotating shaft 70 which is to be accelerated or decelerated with respect to a continuously driven pulley 72. The clutch unit comprises an inner hub 74 adapted for attachment to the shaft 70 by any convenient means, as for example, by the key 76. The hub 74 includes a tubular sleeve portion 78 having a threaded portion 80 for receiving an annular nut 82, a somewhat larger diameter intermediate portion 84 for receiving two bearing members 86, 86 which are separated by a spacer 88, and a somewhat larger diameter portion 80 for receiving the various annular shaped parts of the clutch actuator assembly to be described. Still with reference to the hub 74, a radially outwardly extending flange 92 is provided at the forward end of the hub 74 and defines a rearwardly facing surface 94. The forward side of the hub flange 92 is provided with radially extending cooling ribs as shown at 92a since the clutch unit shown is intended to be primarily air cooled.

The clutch unit shown in FIG. 3 also includes an outer housing 96 which receives the outer races of the bearing members 86, 86 and hence rotatably receives the inner hub 74 and more particularly the sleeve portion 78 thereof. In the embodiment of the invention shown in FIG. 3, the housing 96 preferably carries the pulley 72 on its outer cylindrical surface, although it will be apparent that either the housing or the hub could be so driven depending upon the requirements of a particular installation. As shown, the forward end 98 of the housing 96 defines a radially extending friction surface which is parallel to and axially spaced from the surface 94 of the hub flange 74.

In accordance with the present invention, an annular piston 100 is slidably received between the surfaces 98 and 94 of the housing 96 and inner hub 74 respectively, and it is an important feature of the present invention that this piston 100 is not restrained by axially extending pins or by axially extending splines on either the housing 96 or the hub 74.

In further accordance with the present invention, an annular diaphragm 102 is provided adjacent the rearwardly facing surface 94 of the hub flange, and said diaphragm includes radially spaced rearwardly protruding heads 104 and 106 for engaging the inner and outer marginal edges of the annular piston 100. Means is provided for sealing the inner and outer peripheral edges of the diaphragm with respect to the rearwardly facing surface of the hub flange so that fluid under pressure introduced through a port 108 in the flange is distributed through an annular groove 110 to the front side of the diaphragm to cause the diaphragm to expand rearwardly moving with it the annular piston 100.

Since the hub 74 rotates with the shaft 70, means is provided for piping fluid under pressure, in this case air, to the port 108 in the hub flange through an axial bore 112 in a shaft extension 114 secured to the end of the shaft 70 by suitable means as for example by a threaded portion not shown. A rotary union, or fluid coupling 118, is provided with a fixed air line 120 on its non-rotating end, and a rotating fitting 122 is provided between the shaft extension 114 and the port 108 as shown so as to supply air under pressure to the rotating hub flange.

In still further accordance with the present invention, an annular brake shoe 124 is mounted to the rear face of the annular piston 100 for engaging the forwardly facing friction surface 98 of the housing 96 in response to movement of the diaphragm and piston in said rearward axial direction.

As best shown in FIG. 4, tangentially extending leaf spring elements 126, 126 are connected at one end to the hub flange and at their other ends to the annular piston to react the moments produced upon engagement between the brake shoe 124 and the friction surface 98, which springs also serve to urge the piston forwardly when fluid under pressure is not provided to the front side of the diaphragm.

As best shown in FIG. 3, means is provided for sealing the inner and outer peripheral edges of the diahragm with respect to the rear surface of the hub flange. Preferably said means comprises inner and outer clamping rings 130 and 132, respectively, which rings are held to the rearwardly facing surface of the hub flange and clamp the inner and outer marginal edge portions of the diaphragm thereto by a plurality of screws 134, 134. As best shown in FIG. 4, the outer row of screws 134, 134 also serves to connect one end of each of the leaf springs 126, 126 to the outer clamping ring 132. A plurality of oppositely arranged screws 136, 136 serve to connect the opposite ends of the leaf springs 126, 126 to the periphery of the annular piston 100. As shown in FIG. 4, all of these leaf springs extend generally tangentially between the piston and the outer clamping ring, and are located adjacent the outer periphery of the annular piston. As so constructed and arranged, these springs 126, 126 are well adapted to react torsional moments created as a result of engagement between the brake shoe 124 and its associated friction surface 98 without the necessity for providing axially extending splines or pins in the clutch unit. Since such splines or pins create undesirable non-linear friction characteristics in the response curve of an air operated clutch unit of the type described herein, it will be apparent that the construction disclosed overcomes this defect and carries out the objects of the present invention.

What is claimed is:

1. A device for decelerating a rotating shaft, said device comprising an inner hub for attachment to the shaft, said hub having a radially outwardly extending flange defining a rearwardly facing surface, an outer housing for rotatably receiving said hub, said housing having a forwardly facing surface, an annular piston slidably received between said surfaces, an annular brake shoe mounted to one side of said piston for engagement with one of said surfaces when said piston is moved axially in one direction, an annular diaphragm engageable with the opposite side of said piston, means for sealing the inner and outer peripheral edges of said diaphragm to the other of said surfaces so that fluid under pressure can be introduced to the side of said diaphragm opposite said piston engageable side, spring means acting between said piston and said other surface to react the moments produced upon engagement between said brake shoe and said one surface and to urge the piston in an opposite axial direction when fluid under pressure is not provided to said opposite diaphragm side, said means for sealing the outer peripheral edge of said diaphragm comprising an outer clamping ring attached to the forward end of said outer housing, said spring means comprising a plurality of leaf springs one end of each of which springs is connected to said outer clamping ring and the other end of which is connected to said annular piston, all of said leaf springs extending generally tangentially therebetween in a common radially extending plane and adjacent the outer periphery of said annular piston.

2. A brake unit comprising an inner hub adapted for attachment to a shaft to be braked and having a radially outwardly extending flange defining a rearwardly facing friction surface, an outer housing for rotatably receiving said inner hub and having a forward axial end which faces said friction surface, an annular diaphragm adjacent said forward end of said outer housing, means for sealing the inner and outer peripheral edges of said diaphragm with respect to said forward end of said outer housing so that fluid under pressure can be introduced through passageways in the housing to the rear side of said diaphragm, an annular piston adjacent the forward side of said diaphragm and slidably received between said housing and said hub flange, an annular brake shoe mounted to the forward face of said piston, spring means acting between said piston and said housing to react the moments produced upon engagement between said shoe and said friction surface and to urge the piston rearwardly when fluid under pressure is not provided to the rear side of said diaphragm, said means for sealing the outer peripheral edge of said diaphragm comprising an outer clamping ring attached to the forward end of said outer housing, said spring means comprising a plurality of leaf springs one end of each of which springs is connected to said outer clamping ring and the other end of which is connected to said annular piston, all of said leaf springs extending generally tangentially therebetween in a common radially extending plane and adjacent the outer periphery of said annular piston.

3. A brake unit as defined in claim 2 and further characterized by bearing means between said inner hub and said outer housing, said bearing means being of sufficient axial extent as to preclude wobbling of said friction surface with respect to the forward end of said housing.

4. A brake unit as defined in claim 3 wherein said bearing means comprises at least two side by side roller bearings having their inner races clamped to said hub.

5. A clutch unit comprising an inner hub adapted for attachment to a shaft to be clutched and having a radially outwardly extending flange defining a rearwardly facing surface, an outer housing for rotatably receiving said inner hub and having a forward axial end which defines a friction surface, an annular diaphragm adjacent said rearwardly facing hub flange surface, means for sealing the inner and outer peripheral edges of said diaphragm with respect to said flange surface so that fluid under pressure can be introduced through passageways in said flange to the front side of said diaphragm, an annular piston adjacent the rear side of said diaphragm and slidably received between said housing and said hub flange, an annular brake shoe mounted to the rear face of said piston, spring means acting between said piston and said hub flange to react the moments produced upon engagement between said shoe and said friction surface and to urge the piston forwardly when fluid under pressure is not provided to the front side of said diaphragm, said means for sealing the outer peripheral edge of said diaphragm comprising an outer clamping ring attached to the forward end of said outer housing, said spring means comprising a plurality of leaf springs one end of each of which springs connected to said outer clamping ring and the other end of which is connected to said annular piston, all of said leaf springs extending generally tangentially therebetween in a common radially extending plane and adjacent the outer periphery of said annular piston.

6. A clutch unit as defined in claim 5 and further characterized by bearing means between said inner hub and said outer housing, said bearing means being of sufficient axial extent as to preclude wobbling of said friction surface with respect to said hub flange.

7. A clutch unit as defined in claim 6 wherein said bearing means comprises at least two side by side roller bearings having their inner races clamped to said hub, and said outer housing including means for transmitting rotary motion to said shaft when said brake shoe is moved into engagement with said friction surface.

8. A device for decelerating a rotating assembly of the type having a radially outwardly extending flange, a fixed housing having at least one surface for frictionally engaging a corresponding surface of said flange, a circular diaphragm carried in said housing, means for sealing the outer peripheral edge of said diaphragm with respect to said housing, means for introducing fluid under pressure to one side of said diaphragm, a piston adjacent the opposite side of said diaphragm and slidably received between said housing and said flange, a brake shoe mounted to the face of said piston opposite said diaphragm, and spring means acting between said piston and said housing to urge the piston and brake away from the flange when fluid pressure is not provided to said one side of said diaphragm, said diaphragm comprising an elastomeric member having a protruding annular bead for engaging said piston adjacent the periphery thereof, said diaphragm sealing means comprising at least one annular clamping ring for clamping the outer peripheral edge portion of said diaphragm to said fixed housing, said spring means comprising a plurality of leaf springs one end of each of which springs is connected to said clamping ring and the other end of which is connected to said piston, all of said leaf spring extending generally tangentially therebetween in a common radially extending plane and adjacent the circumference of said piston.

References Cited
UNITED STATES PATENTS

| | | | |
|---|---|---|---|
| 2,466,990 | 4/1949 | Johnson et al. | |
| 2,589,291 | 3/1952 | Sanford | 192—88 |
| 2,659,468 | 11/1953 | Hobbs | 192—88 XR |
| 2,694,478 | 11/1954 | Zeidler | 192—70.18 |
| 3,014,568 | 12/1961 | Peras. | |
| 3,163,274 | 12/1964 | Bowerman et al. | 192—88 |
| 3,185,256 | 5/1965 | Schilling | 192—85 X |
| 3,311,205 | 3/1967 | Suppes et al. | |

BENJAMIN W. WYCHE III, Primary Examiner

U.S. Cl. X.R.
188—152; 192—89